United States Patent [19]

Morin et al.

[11] 3,878,286

[45] Apr. 15, 1975

[54] PROCESS FOR RECOVERING COPPER FROM AQUEOUS SOLUTIONS

[75] Inventors: Edmond A. Morin, Aurora; Hal D. Peterson, Boulder, both of Colo.

[73] Assignee: Colorado School of Mines Research Institute, Golden, Colo.

[22] Filed: June 25, 1973

[21] Appl. No.: 373,479

[52] U.S. Cl. ............... 423/24; 75/101 BE; 75/117; 260/429 J; 260/438.1
[51] Int. Cl. ..................... B01d 15/04; B01d 15/06
[58] Field of Search ........... 423/24; 75/101 BE, 117

[56] References Cited
UNITED STATES PATENTS

| | | | |
|---|---|---|---|
| 3,224,873 | 12/1965 | Swanson | 75/117 X |
| 3,357,821 | 12/1967 | Henrickson | 75/101 BE |
| 3,455,680 | 7/1969 | Ashbrook et al. | 75/117 |
| 3,725,046 | 4/1973 | Hartlage et al. | 75/101 BE |
| 3,755,167 | 8/1973 | Otto et al. | 75/101 BE |

FOREIGN PATENTS OR APPLICATIONS

| | | | |
|---|---|---|---|
| 9,674 | 10/1962 | Japan | 423/24 |

*Primary Examiner*—Earl C. Thomas
*Assistant Examiner*—Brian E. Hearn
*Attorney, Agent, or Firm*—Walter J. Monacelli

[57] ABSTRACT

A process is disclosed for recovering copper from an aqueous solution containing a copper salt, as well as other metal salts, which comprises contacting the aqueous solution with a water-immiscible organic solution containing a hydroxy-oxime selective extractant for copper, and thereafter stripping the copper from the organic solution. In this particular process, the speed of extraction, the breadth of the pH range for extraction, the Cu/Fe ratio and the efficiency in stripping the copper from the organic solution are all improved considerably by having a small amount of a sulfo compound, preferably a dialkyl sulfosuccinate, present in the organic solution. The copper is recovered in a form suitable for electrolytic deposition of metallic copper.

20 Claims, No Drawings

PROCESS FOR RECOVERING COPPER FROM AQUEOUS SOLUTIONS

BACKGROUND OF THE INVENTION

1. Field of the Invention

This invention relates to recovery of copper. More particularly, it relates to a process wherein copper is removed from aqueous solutions containing copper and other metal salts.

2. Related Prior Art

It has become important to recover metals from their ores in high purity form as inexpensively as possible to meet present commercial standards. Furthermore, processes for recovery of metals from low grade ores must be highly efficient to make them economically feasible. These requirements have led to the use of highly refined solvent extraction and ion exchange techniques for the recovery of metals from their ores.

The feed solution for many recovery processes is ordinarily an aqueous solution formed by dissolving the metal ore in dilute acid. In the ion exchange recover processes, ordinarily the solution is contacted with a liquid-liquid or liquid-solid cationic exchange agent, the hydrogen ions on the agent being exchanged for metal ions in solution with the metal being deposited on the ion exchange agent. The metal is then stripped from the ion exchange agent and recovered by standard techniques from the stripping solution. The regenerated ion exchange agent is then returned to the process.

In the case of copper, for example, it has been common practice to dissolve the copper mineral with dilute sulfuric acid. The resulting leach liquor is commonly run through tanks containing iron scrap or tin cans, thereby precipitating the copper as a sludge called "cement copper". This impure product must then be smelted and refined to make the standard high purity copper sold commercially.

A method for producing high purity copper and avoiding the smelting and refining steps is the use of a cationic ion exchange agent to remove copper from the impure leach liquor and concentrate it to a copper sulfate solution strong enough (30 to 50 grams per litre of copper) so that it may serve directly as feed to an electrolytic cell. Cation exchange agents for accomplishing this are available on the market, an example being a 2-hydroxy benzophenoxime sold by the General Mills Company under the trademark "LIX-64N", etc. These compounds are disclosed in U.S. Pat. No. 3,428,449.

Recovery of copper from aqueous solutions derived from acid or ammonical leaching of ores by the use of α-hydroxy oximes is disclosed in U.S. Pat. No. 3,224,873.

While these compositions are effective in recovery of copper from solution, the loading time and the stripping efficiency are not as good as desired, In addition these reagents are effective in a narrow pH range as indicated in U.S. Pat. No. 3,676,106 where an intermediate adjustment of pH must be performed between loading stages.

STATEMENT OF INVENTION

In the process of this invention the recovery of copper from an aqueous solution containing a copper salt by extraction with a water-immiscible organic solution containing a hydroxy-oxime selective extractant is improved in a number of respects by having in the extractant solution a sulfo compound, preferably a dialkyl sulfosuccinate. The presence of the sulfo compound effects improvement in the speed of extraction, in the range of pH suitable for extraction, in the Cu/Fe ratio of the product and in the efficiency of subsequent stripping of the copper from the extractant solution. For example, with sulfo dioctyl succinate, the extraction or loading steps may be performed in 30 seconds or less, as compared to the 2 minutes required in present commercial practice with hydroxy-oximes.

The sulfo compounds preferred for effecting these improvements in the hydroxy-oxime extraction of copper from aqueous solutions of copper salts are dialkyl sulfo-succinates having the formula

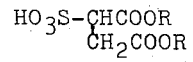

wherein R is an alkyl group of 5–30, preferably 7–20 carbon atoms, such as amyl, hexyl, octyl, nonyl, decyl, dodecyl, tridecyl, nonadecyl, etc. Commercially available sodium salts of such sulfo-succinates, such as sodium sulfodioctyl succinate, may be converted to the appropriate sulfo acid by adding sulfuric acid to a kerosene solution of about 5% sodium sulfodioctyl succinate to a pH of 1 or less and separating and discarding the aqueous layer.

Also suitable for this purpose are alkyl naphthalene sulfonic acids, the alkyl groups attached thereto having a total of 8–30 carbon atoms and being attached as mono-, di- or tri-alkyl groups. Typical alkyl groups are those listed above, with dinonylnaphthalenesulfonic acid being a typical satisfactory compound. This is available commercially in heptane solution.

Another group of suitable sulfo compounds comprise long chain monoalkyl sulfates in which there are 12–30 carbon atoms, preferably at least 18, in the alkyl radical. A typical suitable compound of this type is tridecyl bisulfate prepared by sulfuric acid treatment of tridecyl alcohol.

In effecting the improvement of this invention, the sulfo compound is advantageously used in a proportion of 0.05–1.3 parts per 100 parts by weight of hydroxy-oxime component. With the more efficient sulfosuccinates the proportion is preferably in the range of 0.1–0.5 part, with the optimum proportion being about 0.4 part. When more than 0.5 part of the succinate is used, this produces slower settling and an excess of 1.3 parts generally gives an emulsion. With the sulfosuccinates, the preferred range is 0.1–0.5 part for a pH of 1–2.5. With a pH range of 0.5–1 the proportion of sulfosuccinate may be advantageously raised as high as 1.3 parts, whereas with a pH range of 2.5–3, the proportion may advantageously be lowered to 0.065 part, or even as low as 0.05 part. With the alkyl naphthalene sulfonics, the proportion can go as high as 5–13 parts without emulsification, but the optimum in that case is about 1.3 parts. The proportions reported above are parts by weight of sulfo compound per 100 parts of hydroxy-oxime component.

In addition to the other advantages cited below, the dialkyl sulfosuccinates, such as dioctylsulfosuccinate, are particularly suited for the purposes of this invention because of their stability and retention in the extractant solution. For example in a series of test extractions it was found that after 116 cycles only 5% of the original amount of dioctyl sulfosuccinate needed to be added to replace that amount lost through entrainment, water solubility or decomposition.

Moreover, the increased efficiency effected by the presence of the sulfo compound permits a reduction in the number of stages required to give economical commercial recovery, for example with extractions that use 3–5 extraction stages to give satisfactory recovery, the number of stages may be reduced to 2–4, or even to 1–3, with equally satisfactory or even more effective recovery.

The hydroxy benzophenones suitable for use in the present invention have the following basic structure:

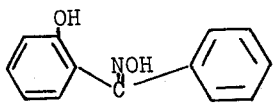

The compounds which are most useful for the present invention are substituted by a saturated or ethylenically unsaturated aliphatic group or groups or the corresponding ether group or groups so as to have a suitable degree of soluility in a solvent to be used for the liquid-liquid ion exchange separation.

The benzophenoximes preferred for the present invention are those which have sufficient solubility in one or more of the above solvents or mixtures thereof to make about a 2% solution and which are essentially insoluble or immiscible with water. At the same time, the ion exchange reagent should form a complex with the copper which likewise is soluble in the organic solvent to at least the extent of about 2% by weight. These characteristics are achieved by having alkyl, ethylenically unsaturated aliphatic or ether substituents on either ring. Generally it is necessary to have substituents which total at least 3 carbon atoms. This minimum may be obtained by means of a total of 3 methyl groups distributed on either one or on the two rings, by means of a methyl and an ethyl group, by means of a propyl group, etc. Usually it is preferred not to have more than 25 carbon atoms total in the substituents since these substituents contribute to the molecular weight of the oxime without improving operability. Large substituents, therefore, increase the amount of oxime for a given copper loading capacity. In general, the branched chain of alkyl substituents effect a greater degree of solubility of the reagent and of the copper complex and, accordingly, these are preferred. A variety of typical compounds useful for the present invention include the following:

2-hydroxy-3'-methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methylbenzophenoxime
2-hydroxy-4',5-bis(1,1-dimethylethyl)benzophenoxime A wide variety of other compounds within the scope of the present invention may, likewise, be devised and it is a simple matter to determine their effectiveness by simply testing the solubility of the compounds in one or more of the above hydrocarbon solvents or mixtures thereof. In general the aromatic or aliphatic substituted aromatic hydrocarbon solvents are preferred from the standpoint of improved solubility. The 2-hydroxy benzophenoximes are preferably used in an amount of about 2 to 50% by weight and more preferably about 2 to 25% by weight based on the weight of the organic phase.

The preferred substituted hydroxy benzophenoximes useful in the present invention have the following formula

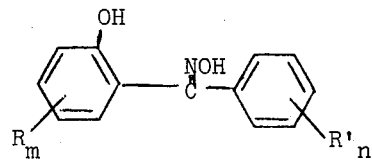

in which R and R' may be individually alike or different and are saturated aliphatic groups, ethylenically unsaturated aliphatic groups or saturated or ethylenically unsaturated aliphatic ether groups (i.e. OR) and $m$ and $n$ are 0, 1, 2, 3 or 4 with the proviso that $m$ and $n$ are not both 0. In such preferred extractants, the total number of carbon atoms in $R_m$ and $R'_n$ is from 3 to 25, R and R' contain 1 to 25 carbon atoms when saturated aliphatic and R and R' contain 3 to 25 carbon atoms when ethylenically unsaturated. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred.

As indicated from the representative compounds set forth hereinabove and the described starting phenols and the like, various alkyl groups can be used as R and R'. And as set forth, such groups may be branched or straight chain. Various ethylenically unsaturated groups can also be used as R and R' and the same may be branched or straight chain. Representative of such groups are pentenyl, hexenyl, octenyl, decenyl, dodecenyl, octadecenyl, and the like. It is preferred that such groups contain less than about 2 double bonds and more preferably a single double bond. The R portion of the ether groups can be saturated and ethylenically unsaturated aliphatic groups as described above. The R portion of the said ether groups is preferably an alkyl group. In addition, the saturated, ethylenically unsaturated and ether groups may contain inert substituents such as halogen, ester, amide and the like. Likewise, the aromatic nuclei can contain inert substituents. By inert is meant that the said substituents do not affect the solubility, stability or extraction efficiency of the compounds to any significant extent.

As previously mentioned, other hydroxy oximes useful in the practice of this invention are the α-hydroxy oximes described in U.S. Pat. No. 3,224,873 and the description therein of the α-hydroxy oximes is incorporated herein by reference. In general, these α-hydroxy oxime extractants have the formula

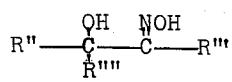

where R″, R‴ and R″″ may be any of a variety of organic hydrocarbon radicals such as aliphatic and alkyl-aryl radicals, R″″ may also be hydrogen. Preferably, R″ and R‴ are unsaturated hydrocarbon or branched chain alkyl groups containing from about 6 to 20 carbon atoms. R″ and R‴ are also preferably the same, and when alkyl are preferably attached to the carbons substituted with the —OH and =NOH groups attached through a secondary carbon atom. It is also preferred that R″″ is hydrogen or unsaturated hydrocarbon or branched chain alkyl group containing from about 6 to 20 carbon atoms. The α-hydroxy oximes also preferably contain a total of about 14 to 40 carbon atoms. Representative compounds are given in the foregoing reference and processes are disclosed for preparing them.

Typical compounds are 19-hydroxyhexatriconta-9,27-dien-18-oxime, 5,10-diethyl-8-hydroxytetradecan-7-oxime, and 5,8-diethyl-7-hydroxy-dodecane-6-oxime. The latter compound has the following structural formula:

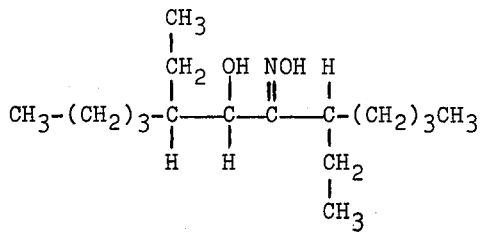

Representative of other mono- and poly-unsaturated radicals are heptenyl, octenyl, decenyl, dodecenyl, octadecenyl and alkyl substituted radicals such as ethyloctadecenyl. Representative of other mono- and polyalkyl substituted saturated radicals are ethylhexyl, diethylheptyl, butyldecyl butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

While either of the two types of hydroxy-oximes described above can be used individually as extractants for copper, it has been found that a combination of a major amount of a hydroxybenzophenoxime with a minor amount, advantageously 2–50 percent by weight and preferably 2–25 percent based on the combined weight of the two types, of an aliphatic hydroxyoxime as described above, is preferred. It appears that the latter type of hydroxyoxime serves as an activator for the hydroxybenzophenoxime.

A wide variety of organic diluents, in which the extraction reagent is dissolved, can be employed according to this invention. The minimum requirements for the diluent, however, are that the diluent be substantially water-immiscible, that it will dissolve the extraction reagent, and that it will not interfere with the function of the reagent in extracting the copper values from acid solutions. These diluents can be aliphatic or aromatic hydrocarbons, halogenated hydrocarbons, petroleum derivatives, ethers, etc. Examples of these various diluents include toluene, carbon tetra-chloride, benzene, xylene, fuel oil, chloroform, 2-ethyl-hexanol, and particularly kerosene. Generally, all these hydrocarbon solvents have specific gravities in the range of 0.65–0.95 and have a mid-boiling point in the approximate range of 120°F.–615°F. (ASTM distillation). In addition to the simple hydrocarbon solvents, the chlorinated hydrocarbon ethers and alcohols may also be used and in some instances may improve solubility. Accordingly, both the unsubstituted and the substituted hydrocarbon solvents are contemplated by the term "liquid hydrocarbon".

Generally, the hydroxy oxime extractant will be present in the organic phase in an amount sufficient to extract at least a portion of the copper values from the aqueous solutions. Preferably the oxime will be present in the amount of from about 5 to about 20% by weight based on the total organic phase with an amount of from 5 to 10% by weight being particularly preferred.

Although the volumetric phase ratios of the organic extractant to the aqueous solution can vary depending upon several factors including the amount of copper present in the aqueous phase and the concentration of hydroxy oxime in the organic phase, generally volumetric phase ratios of from about 1:2 to about 2:1 will be used. These ratios will extract essentially all of the copper from the aqueous solution within an appropriate time period. However in view of the tremendous volume of solutions being treated in a commercial operation of this type, the time required for such extraction and separation of the organic and aqueous phases is a critical economic factor. Prior to the present invention and under the most favorable circumstances an extraction or contacting period of at least 2 minutes has been necessary. By the improvement of the present invention in which a very small amount of a sulfo compound, preferably a dialkyl sulfosuccinnate, is used in conjunction with the larger amount of the hydroxy oxime the extraction time may be reduced to 30 seconds and in most cases even less to 6–10 seconds.

Moreover, in addition to this synergistic effect caused by the minute amount of sulfo compound, the permissible pH range is broadened and the stripping of the copper from the organic layer is improved by the presence of the sulfo compound.

Contacting of the acid solution containing the copper with the solvent extraction reagent may be carried out by any of the well-known procedures employed in solvent-solvent extractions. Although continuous countercurrent methods are preferred, batch, continuous batch, and batch countercurrent methods are also useful. Any suitable liquid-liquid contacting means may be employed, such as a pulse column, a countercurrent rotating disc column, and the like. The temperature at which the mixing is carried out is not critical, but advantageously the temperature is maintained at about 20°C. to 40°C.

The extraction preferably takes place at a pH in the range of about 0.5 to about 3.0.

The ratio of the volume of the organic phase to the aqueous phase can be varied considerably and the most efficient ratio in each case can be readily determined by one skilled in the art. The particular ratio selected for any given extraction may depend upon the extraction reagent, diluent, and type of coppere bearing solution employed as well as their concentration and the method of mixing them, etc. Countercurrent methods are usually desirable when the ratio of the organic phase to the aqueous phase is relatively low. It has been found that for extraction in a pulse column, an organic to aqueous ratio of about 1:1 is very satisfactory.

After the copper values have been transferred to the organic phase and the aqueous and organic phases separated, the copper containing organic phase is transferred to a stripping circuit which can be any suitable liquid-liquid contactor. In the stripping circuit the copper-containing organic phase is advantageously contacted with 10–20% by volume of a mineral acid, e.g. sulfuric, nitric or hydrochloric, the choice of acid depending on the copper salt required. As previously indicated the presence of the sulfo compound in the organic layer improves the rate and efficiency of the stripping operation so that it may be completed in 30 seconds or less as compared to the 2 minutes or more previously required.

The aqueous acid solution in which the copper is initially contained may be prepared by leaching an ore containing copper with an acid. Nitric or sulfuric acid has been found to be the most suitable for the leaching step. After leaching, the leach slurry may be filtered to obtain a solution containing copper or the leach slurry may be contacted directly with the mixed extraction reagent according to the invention. From an economic standpoint there may be considerable advantage in conducting the extraction directly on the leach slurry.

For test and experimental purposes, the extraction, separation of phases and stripping operations may be performed in separatory funnels. The results from separatory funnel tests correlate very well with pilot plant and commercial size operations. For pilot plant and commercial practice a variety of types of equipment may be used, but preferably the box type of equipment is used as described and illustrated in the December 1965 issue of the Journal of the Society of Mining Engineering, pages 76–80. The descriptions of techniques for determination of maximum loading capacity of organic solution for copper, equilibrium isotherms for extraction and stripping, and use of the equilibrium isotherms for determining the number of extraction stages required for substantially complete removal of copper are also useful in the practice of this invention and the details thereof are incorporated herein by reference.

In a single stage box type arrangement the aqueous feed and the extractant solutions are metered in the desired ratio into a small square or rectangular mixer box having an impeller for intimate mixing. After a residence time in the mixer or a mixing period of 30 seconds or less (compared to 2 minutes or more in prior practice) the mixture overflows to a square or rectangular settler box of a size to effect a residence time of about 5 minutes, where the phases are separated automatically, the aqueous raffinate being drawn off the bottom and the organic layer transferred by impeller pump to the square or rectnagular stripper box where the desired amount of acid is added and mixed by an impeller for 30 seconds or less (again as compared to 2 minutes or more in the prior art) before being overflowed to another settling box where the phases are separated.

Where two or more stages are used for the extraction, there are a series of mixer and settler boxes with the aqueous raffinate from the first stage settler being fed to the third stage mixer, etc., with the aqueous raffinate from the final stage being discarded. The extractant is added in the reverse order with the fresh extractant being added to the mixer in the final stage, the organic layer from the last stage settler being added to the mixer of the preceding stage, etc., until the first stage is reached where the organic layer from the first stage settler is fed to the stripper box. As previously stated, the improved efficiency of the process of this invention enables the elimination of one and possibly two stages with equivalent ultimate recovery from a three or four stage recovery process.

It has been noted that the presence of the sulfo compounds in the extractant actually reduces the time required for extraction to much less than 30 seconds. In most cases the extraction reaches an equilibrium between phases between 6–10 seconds. However for comparative purposes with prior art practices the working examples reported below use a standard extraction or contact time of 30 seconds.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

A concentrate of dioctyl sulfosuccinate is prepared as follows. A commercially available paste of sodium sulfodioctylsuccinate is added to kerosene to give a concentration of about 5%. The dilute sulfuric acid is added in sufficient quantity to react with the amount of sodium present and to produce a pH of 1 or less. After the mixture has been agitated, the two phases are allowed to separate and the aqueous layer discarded. The kerosene solution is used to modify hydroxyoxime extractions in the following examples, the amount to be added being calculated from the concentration in accordance with the amount of sulfosuccinate initially added to prepare the concentrate. If desired the kerosene in this solution may be used as diluent in preparing the hydroxyoxime solutions used for extraction. Also if desired the sodium dioctyl sulfosuccinnate may be added directly to the solution of hydroxyoxime and converted in situ to the acid form by treatment with dilute sulfuric acid until the aqueous phase shows a pH of less than 1.

EXAMPLE II a. Portions of a solution containing 2.25 grams of copper per liter and having a pH of 2.16 are treated in separatory funnels in a series of separate, individual extractions with a kerosene solution (Nap 470) containing 81.4 grams per liter of 5,8-diethyl-7-hydroxydodecan-6-oxime. Each extraction is for 30 seconds with the organic/aqueous ratios and results shown in the table below:

| Organic/Aqueous Volume Ratio | Percent Cu Extracted |
| --- | --- |
| 10 | 33.89 |
| 5 | 25.76 |
| 3 | 19.87 |
| 2 | 13.68 |
| 1 | 11.02 | b. The foregoing procedure is repeated except that the extracting solution also contains 0.15 grams per liter of dioctyl sulfosuccinate prepared as described in Example I. The improved results are shown in the following table:

| Organic/Aqueous Volume Ratio | Percent Cu Extracted |
|---|---|
| 10 | 70.94 |
| 5 | 48.87 |
| 3 | 35.76 |
| 2 | 28.32 |
| 1 | 20.03 |

Similar results are obtained when the above procedures are repeated using as the hydroxyoime equivalent amounts respectively of 19-hydroxyhexatriaconite-9,27-dien-18-oxime and hydroxyoximes having the formula

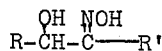

wherein R and R' are mixed branched chain alkyl groups containing 9 carbon atoms. Similar improved results are also obtained when the dioctyl sulfosuccinate is replaced by equivalent amounts respectively of the diheptyl, dinonyl, de-decyl and di-nonadecyl sulfosuccinates.

Using the proportions of IIa and IIb with 30-second stages of extraction it is found through use of the McCabe-Thiele method of analysis that for a pregnant extractant of a solution containing 1.5 grams of copper per liter that four stages give a recovery of only 41.3% Cu in (a) whereas two stages in (b) give an 84.4% Cu recovery.

Moreover, stripping of the Cu from the extractant solutions with 30-second contact with 15% sulfuric acid results in a pronounced increase in stripping efficiency for extractant (b).

EXAMPLE III

The procedures of Example IIa and IIb are repeated using as the hydroxyoxime 26.3 grams per liter of 2-hydroxy-5-octylbenzophenonoxime. With 30-second extractions the results are as shown below:
a. Without the sulfosuccinate

| Organic/Aqueous Volume Ratio | Percent Cu Extracted |
|---|---|
| 10 | 57.40 |
| 5 | 47.98 |
| 3 | 44.39 |
| 2 | 44.05 |
| 1 | 41.70 | b. With the sulfosuccinate

| Organic/Aqueous Volume Ratio | Percent Cu Extracted |
|---|---|
| 10 | 98.88 |
| 5 | 97.76 |
| 3 | 94.17 |
| 2 | 91.93 |
| 1 | 78.92 |

Similar results are obtained when the above procedures are repeated, using as the hydroxyoxime, equivalent amounts respectively of:
2-hydroxy-5,5'-dibutylbenzophenoxime
2-hydroxy-5-dodecylbenzophenoxime
2-hydroxy-3,5-dinonylbenzophenoxime
2-hydroxy-5-octyl-2',4',5'-trimethylbenzophenoxime
2-hydroxy-5-nonyl-2',5'-dimethylbenzophenoxime
Similar results are obtained when the dioctyl sulfosuccinate is replaced by equivalent amounts respectively of dinonyl and di-tetradecyl sulfosuccinate.

Using the proportions of IIa and IIb with 30-second stages of extraction it is found through use of the McCabe-Thiele method of analysis that for a pregnant extractant of 1.5 grams per liter copper that two stages give a recovery of only 43% Cu in (a) whereas two stages in (b) give a 98.8% Cu recovery.

Moreover, stripping of the Cu from the extractant solutions with 30-second contact with 15% sulfuric acid results in a pronounced increase in stripping efficiency for extractant (b).

EXAMPLE IV

The procedures of Examples IIa and IIb are repeated using as the hydroxyoxime a combination of 35.4 grams of 2-hydroxy-5-octylbenzophenoxime and 3 grams of 5,8-diethyl-7-hydroxydodecan-6-oxime per liter of extractant. With 30-second extractions the results are as follows:
a. Without dioctyl sulfosuccinate

| Organic/Aqueous Volume Ratio | Percent Cu Extracted |
|---|---|
| 10 | 70.56 |
| 5 | 65.28 |
| 3 | 52.68 |
| 2 | 48.18 |
| 1 | 37.43 | b. With dioctyl sulfosuccinate

| Organic/Aqueous Volume Ratio | Percent Cu Extracted |
|---|---|
| 10 | 92.64 |
| 5 | 86.18 |
| 3 | 75.62 |
| 2 | 64.56 |
| 1 | 39.06 |

Similar results are obtained when the benzophenoxime is replaced with equivalent amounts respectively of
2-hydroxy-5,5'-dibutylbenzophenoxime
2-hydroxy-3,5-dinonylbenzophenoxime
2-hydroxy-5-nonyl-2',5'-dimethylbenzophenoxime
and also when the aliphatic hydroxyoxime is replaced with equivalent amounts respectively of 19-hydroxyhexatriaconte-9,27-dien-18-oxime.

EXAMPLE V

The procedures of Examples II-IV are repeated using in place of the sulfosuccinate 0.18 grams per liter of dinonylnaphthalene sulfonic acid. Improved results are likewise noted when the sulfonic acid is present. Similar improved results are noted when the sulfonic acid used is an equivalent amount respectively of:
dioctylnaphthalene sulfonic acid
trihexylnaphthalene sulfonic acid
nonadecylnaphthalene sulfonic acid
tetradecylnaphthalene sulfonic acid.

EXAMPLE VI

The procedures of Examples II–IV are repeated using, in place of the sulfosuccinate, 0.15 gram per liter of tridecyl sulfate ($C_{13}H_{27}OSO_2OH$) prepared by acidifying a kerosene solution of commercially available sodium tridecyl sulfate. Improved results are likewise noted when the tridecyl sulfate is present. Similar improved results are noted when sulfate used is an equivalent amount respectively of the following corresponding sulfates:
Hexadecyl sulfate
Nonadecyl sulfate
Octadecyl sulfate.

EXAMPLE VII a. A leach solution containing 2.25 grams of copper per liter and having a pH of 2.16 is treated with a commercial aliphatic hydroxyoxime of the type disclosed in U.S. Pat. No. 3,224,873 and having the trade designation LIX–63. The commercial concentrate is diluted to ten volumes with kerosene (to a 10 volume percent) and the leach solution is agitated with the organic solution in various volume ratios for 30 seconds each with the results shown in the table below:

| Organic/Aqueous Volume Ratio | Percent Cu Extracted |
|---|---|
| 10 | 34.68 |
| 5 | 26.67 |
| 3 | 20.00 |
| 2 | 14.67 |
| 1 | 11.11 | b. The above procedure is repeated except that dioctyl sulfosuccinate is added to the LIX–63 in a proportion of 0.15 gram per 100 ml. of original LIX–63 concentrate. The improved results are shown in the following table:

| Organic/Aqueous Volume Ratio | Percent Cu Extracted |
|---|---|
| 10 | 71.56 |
| 5 | 49.23 |
| 3 | 36.00 |
| 2 | 28.89 |
| 1 | 20.00 |

EXAMPLE VIII a. A leach solution having 2.25 grams of Cu per liter and a pH of 2.16 is treated with a commercial hydroxyoxime extractant having the trade designation LIX–64N. The commerical concentrate is diluted with kerosene to 10 volume percent, and the leach solution is treated in various volume ratios for agitated contact periods of 30 seconds each with the results shown in the table below:

| Organic/Aqueous Volume Ratio | Percent Cu Extracted |
|---|---|
| 10 | 72.96 |
| 5 | 67.36 |
| 3 | 54.88 |
| 2 | 50.24 |
| 1 | 39.52 | b. The foregoing procedure is repeated except that the kerosene solution contains, per 100 ml. of the original hydroxyoxime concentrate, 0.15 gram of commercial Na tridecyl sulfate which has been coverted to its acid form by treatment with dilute sulfuric acid (as in Example I) to a pH of less than 1. The improved results are shown in the table below:

| Organic/Aqueous Volume Ratio | Percent Cu Extracted |
|---|---|
| 10 | 94.72 |
| 5 | 88.16 |
| 3 | 77.60 |
| 2 | 66.56 |
| 1 | 40.00 |

Similar improvement is noted when the tridecyl sulfate is replaced with equivalent amounts respectively of dodecylsulfte, decylsulfate and heptadecylsulfate.

EXAMPLE IX a. A leach solution having a pH of 2.04 and containing 2.16 grams of Cu and 2.2 grams of Fe per liter is treated with a commercial extractant having the trade designation LIX–64N containing both an alkylated hydroxybenzophenone oxime of the type shown in U.S. Pat. No. 3,428,449 and an aliphatic hydroxyoxime of the type shown in U.S. Pat. No. 3,224,873. The commercial concentrate is diluted in kerosene to 10 volume percent and used for extraction of the leach solution in 30-second agitated contact with various organic/aqueous ratios as shown below:

| Organic/Aqueous Volume Ratio | Percent Cu Extracted | Cu to Fe Ratio in Product |
|---|---|---|
| 10 | 84.72 | 10.7 |
| 5 | 77.31 | 18.2 |
| 3 | 72.22 | 28.2 |
| 2 | 71.29 | 35.5 |
| 1 | 66.20 | 48.5 |
| 0.5 | 44.44 | 60.0 | b. The foregoing procedure is repeated except that 0.15 gram of dioctyl sulfosuccinate is present in the extracting solution per 100 ml. of original concentrate of the LIX–64N. The improved results are shown below:

| Organic/Aqueous Volume Ratio | Percent Cu Extracted | Cu to Fe Ratio in Product |
|---|---|---|
| 10 | 99.07 | 15.3 |
| 5 | 98.78 | 19.3 |
| 3 | 95.34 | 40.6 |
| 2 | 93.63 | 48.0 |
| 1 | 79.90 | 77.6 |
| 0.5 | 50.00 | 92.7 |

EXAMPLE X

To illustrate the improved effect of this invention on the stripping step, the procedure of Example IX is repeated several times with the additives indicated below:

A—uses LIX-64N diluted with kerosene to 10 volume %;

B—uses the same as A plus 0.18 gm. dinoylnaphthalene sulfonate per 100 ml. of LIX-64N;

C—uses the same as A plus 0.15 gm. dioctyl sulfosuccinate per 100 ml. of LIX-64N;

The leach solution contains 2.32 gms. Cu per liter and has a pH of 2.16. In order to achieve maximum loading with the LIX-64N without the additive of this invention, a loading or contact time of 2 minutes is used for each stage. While this amount of time is not necessary for Runs B and C, the same contact time of 2 minutes is used to have indentical, comparable conditions. An oil/aqueous ratio of 1 is used in 3 stages for extraction with fresh aqueous solution for each stage. A stripping solution of 16% $H_2SO_4$ is used in each case with a stripping contact time of 30 seconds. The results are tabulated below.

| O/A Vol. Ratio | Percent Copper Stripped | | |
|---|---|---|---|
| | A - LIX-64N alone | B - plus Dinonyl naphthalene sulfonate | C - plus Dioctyl sulfosuccinate |
| 10 | 33.6 | 35.2 | 77.3 |
| 6 | 50.1 | 57.3 | 93.7 |
| 3 | 59.8 | 83.5 | 96.8 |
| 2 | 70.3 | 88.7 | 99.2 |
| 1 | 90.3 | 96.2 | 99.9 |

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. In the process for the recovery of copper values from an aqueous solution comprising the steps of
  1. contacting said aqueous solution with an organic phase to extract at least a portion of the copper values in the organic phase, the organic phase comprising a liquid hydrocarbon and a hydroxyoxime having a solubility of at least 2 percent by weight in the liquid hydrocarbon selected from the class consisting of
     a. an alkyl substituted, ethylenically unsaturated substituted and alkyl or ethylenically unsaturated aliphatic ether substituted 2-hydroxy benzophenoxime, and
     b. an α-hydroxy oxime having the formula

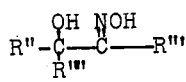

wherein R'' and R''' are organic hydrocarbon radicals and R'''' is a hydrogen or a hydrocarbon radical;
  2. separating the resultant copper-pregnant organic phase and the resultant copper-barren aqueous phase; and
  3. recovering the copper-pregnant organic phase;
    the improvement comprising the presence of 0.05-1.3 parts by weight per 100 parts by weight of hydroxyoxime of a sulfo compound selected from the class consisting of
      i. A dialkyl sulfosuccinate wherein said alkyl groups each have 5-30 carbon atoms;
      ii. an alkylated naphthalenesulfonic acid having 1-3 alkyl groups and a total of 8-30 carbon atoms in said alkyl groups; and
      iii. an alkyl sulfate of the formula Alkyl-$OSO_2OH$ wherein the alkyl group has 12-30 carbon atoms;
provided that where said sulfo compound is an alkylated naphthalene sulfonic the amount thereof may be as high as 13 parts by weight per 100 parts of hydroxyoxime.

2. The process of claim 1 in which the hydroxyoxime is a 2-hydroxybenzophenoxime having the formula

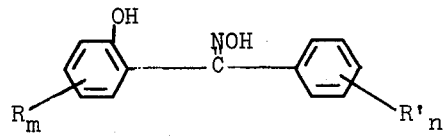

in which R and R' may be indiviually alike or different and are saturated aliphatic groups of 1-25 carbon atoms, ethylenically unsaturated aliphatic groups of 3-25 carbon atoms or —OR'' where R'' is a saturated or ethylenically unsurted aliphatic group as defined, $m$ and $m$ are 0, 1, 2, 3 or 4 with the proviso that both are not 0 and the total number of carbon atoms in $R_m$ and $R'_n$ is from 3-25.

3. The process of claim 2 in which said sulfo compound is a dialkyl sulfosuccinate wherein said alkyl groups each have 5-30 carbon atoms.

4. The process of claim 2 in which said sulfo compound is dioctyl sulfosuccinate.

5. The process of claim 4 in which there is 0.1-0.5 part of dioctyl sulfosuccinate per 100 parts of said 2-hydroxybenzophenoxime.

6. The process of claim 5 in which said 2-hydroxybenzophenoxime is 2-hydroxy-5-octylbenzophenoxime.

7. The process of claim 5 in which said 2-hydroxybenzophenoxime is 2-hydroxy-5,5'-dibutylbenzophenoxime.

8. The process of claim 5 in which said 2-hydroxybenzophenoxime is 2-hydroxy-3,5-dinonylbenzophenoxime.

9. The process of claim 5 in which said 2-hydroxybenzophenoxime is 2-hydroxy-5-nonylbenzophenoxime.

10. The process of claim 5 in which said 2-hydroxybenzophenoxime is 2-hydroxy-5-nonyl-2',5'-dimethylbenzophenoxime.

11. The process of claim 1 in which the hydroxyoxime is a mixture of said substituted 2-hydroxy benzophenoxime and said α-hydroxy oxime, the total of said oximes comprising 2-50 percent by weight of said organic phase and said α-hydroxyoxime comprising 2–50 percent by weight or the combined weight of said oximes.

12. The process of claim 11 in which said sulfocompound is a dialkyl sulfosuccinate.

13. The process of claim 12 in which said sulfocompound is dioctyl sulfosuccinate.

14. The process of claim 12 in which said 2-hydroxy benzophenoxime has the formula

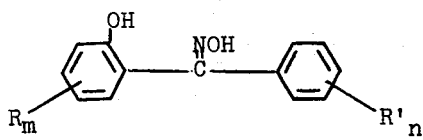

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined, $m$ and $n$ are 0, 1, 2, 3 or 4 with the proviso that both are not 0 and the total number of carbon atoms in $R_m$ and $R'_n$ is from 3–25.

15. The process of claim 14 in which said sulfocompound is dioctyl sulfosuccinate.

16. The process of claim 14 in which said α-hydroxyoxime is 5,8-diethyl-7-hydroxydodecan-6-oxime.

17. The process of claim 14 in which said α-hydroxyoxime is 19-hydroxyhexatriaconte-9,27-dien-18-oxime.

18. The process of claim 1 in which said liquid hydrocarbon is kerosene.

19. The process of claim 1 in which said copper values are stripped from said organic phase by an acid.

20. The process of claim 1 in which said acid is sulfuric acid.

* * * * *